Figure 1A:
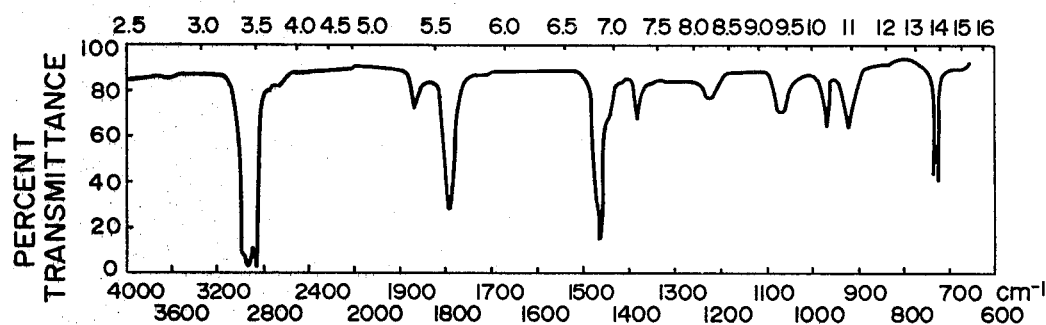

United States Patent [19]

Nobuo

[11] 4,082,558
[45] Apr. 4, 1978

[54] NOVEL POLYOLEFIN WAXES AND AQUEOUS POLISHING EMULSIONS THEREOF

[75] Inventor: Yokoyama Nobuo, Yokohama, Japan

[73] Assignee: Nippon Oil Co., Ltd., Tokyo, Japan

[21] Appl. No.: 624,216

[22] Filed: Oct. 20, 1975

[30] Foreign Application Priority Data

Oct. 22, 1974 Japan .................................. 49-121000
Oct. 22, 1974 Japan .................................. 49-121001
Dec. 13, 1974 Japan .................................. 49-142594

[51] Int. Cl.$^2$ ............................................. C09G 1/08
[52] U.S. Cl. ..................................... 106/10; 106/270;
106/271; 252/311; 260/28.5 A; 260/878 R
[58] Field of Search .................... 106/10, 270, 271;
260/28.5 A, 878 R; 252/311

[56] References Cited

U.S. PATENT DOCUMENTS

| | | | |
|---|---|---|---|
| 3,392,131 | 7/1968 | Miles et al. ................. | 260/28.5 A |
| 3,424,599 | 1/1969 | Kaupp et al. ................. | 106/270 |
| 3,590,076 | 6/1971 | Heintzelman et al. ......... | 106/10 |
| 3,859,386 | 1/1975 | Mainord ...................... | 260/28.5 A |
| 3,933,511 | 1/1976 | Heintzelman et al. ......... | 106/10 |
| 3,951,924 | 4/1976 | Ripley ........................ | 260/878 R |

FOREIGN PATENT DOCUMENTS 799,951  8/1958  United Kingdom.

*Primary Examiner*—Lorenzo B. Hayes
*Attorney, Agent, or Firm*—Frank J. Jordan

[57] ABSTRACT

Process for the preparation of esterified or metal-containing polyolefin waxes which comprises esterifying or neutralizing maleinated polyolefins with a polyhydric alcohol or with a metal compound in which the metal is selected from those of Group II of the Periodic Table; and aqueous polishing emulsions containing as the main ingredient the esterified or metal-containing polyolefin wax. This invention also relates to aqueous polishing emulsions containing the maleinated polyolefin wax as the main ingredient.

13 Claims, 3 Drawing Figures

INFRA-RED ABSORPTION CAUSED BY MALEINISED POLYETHYLENE WAX

INFRA-RED ABSORPTION CAUSED BY CALCIUM-CONTAINING POLYETHYLENE WAX

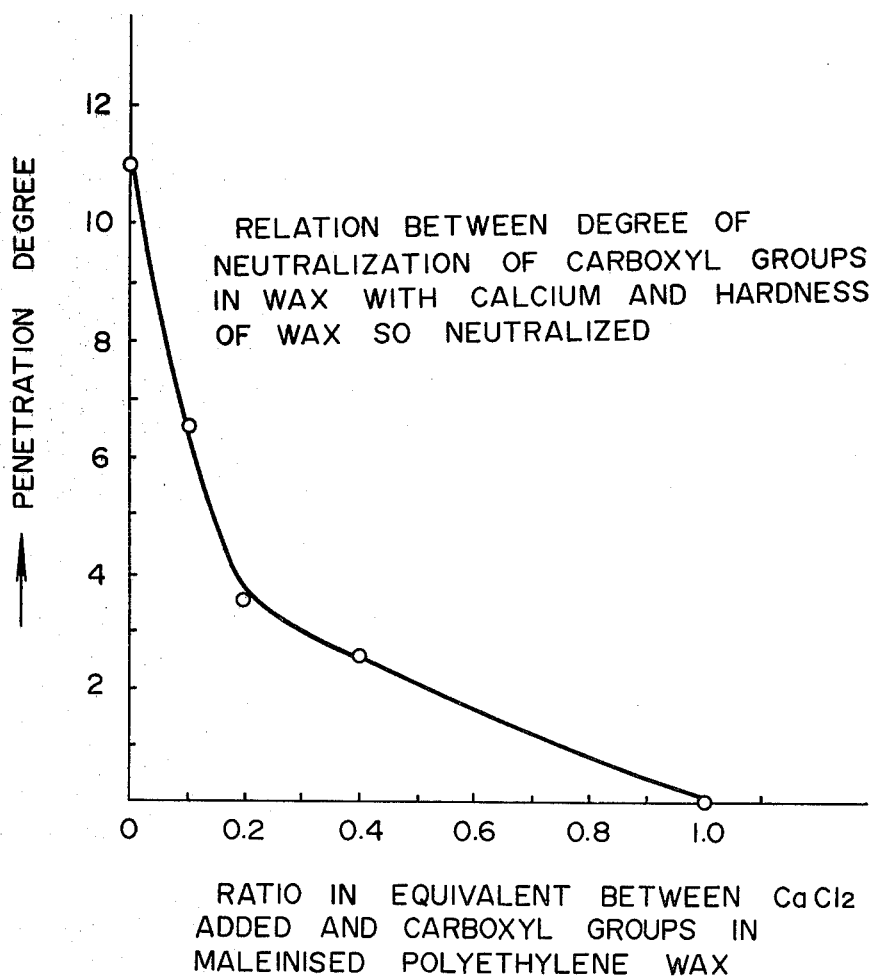

NOVEL POLYOLEFIN WAXES AND AQUEOUS POLISHING EMULSIONS THEREOF

This invention relates to a novel wax, a process for preparing the novel wax, and an aqueous polishing emulsion thereof. More particularly it relates to an acid-modified polyolefin wax and derivatives thereof, a process for preparing the acid-modified polyolefin wax and derivatives thereof, and an aqueous polishing emulsion of these waxy compounds.

In general, typical of wax are natural waxes, petroleum-derived waxes and synthetic waxes, and these kinds of waxes have widely been used. The properties required in the waxes vary depending on the purpose for which they are used. However, in many cases, the waxes are required to have a certain range of hardness (ASTM D1321-70) indicated in terms of melting point (ASTM D127-63, etc.) and penetration degree, and are desired to have satisfactory capability of being emulsified and good luster. They are further required, for instance, to exhibit good workability when processed to obtain final products therefrom, to show satisfactory properties at the time of being melted and not to emit an offensive odor when melted. Among the waxes natural waxes, particularly, carnauba wax is well known for its suitable hardness, good luster, satisfactory susceptibility to emulsification, suitable melting point, melt viscosity and other desirable properties, and is therefore widely used as an excellent wax material for polishing agents, fiber treating agents, foodstuff treating agents and the like. However, natural waxes, particularly, carnauba wax has recently been scarce due to its producible districts being limited, and has therefore been remarkably raised in price. Thus, a substitute for an excellent wax such as carnauba wax has been sought to be developed and obtained easily and at a lower cost. Such being the case, many attempts have been made to obtain such substitutes. For example, so-called oxidized waxes which are obtained by oxidizing petroleum-derived waxes in air, do not exhibit satisfactory emulsification susceptibility and balanced properties and they therefore cannot be said to be satisfactory substitutes. Attempts have also been made to develop maleinized or maleinated polyolefins, such as maleinated polyethylenes and polypropylenes, into such subtitutes as mentioned above; however, the substitutes thus obtained from the maleinated polyolefins are improved in emulsification susceptibility, but they are not satisfactory in workability nor are they well balanced in hardness at ambient temperatures and melt viscosity, whereby they are limited in use.

The present inventor had made intense studies in attempts to obtain wax having properties comparable to those of carnauba wax and, as a result of his studies, it has been found that polyolefin waxes are reacted with ethylenically unsaturated dibasic acids or anhydrides thereof to obtain acid-modified polyolefin waxes for use as material for coating or polishing agents or polishing aqueous emulsions. Furthermore, part or all of the carboxyl groups contained in the acid-modified polyolefin waxes are then esterified or neutralized with at least one polyhydric alcohol or with at least one compound of a metal of Group II of the Periodic Table in the presence of water or an acid as catalyst, thereby to obtain waxy substances having excellent properties.

An object of this invention is to provide a process for preparing novel polyolefin waxes and polishing aqueous emulsions thereof.

This object is achieved by reacting a starting polyolefin wax having an average molecular weight of 400 - 1,500 with an ethylenically unsaturated dibasic acid or anhydride thereof to produce an acid-modified polyolefin wax and partly or wholly neutralizing the thus-produced acid-modified wax with a polyhydric alcohol having preferably 2 - 4 carbon atoms or with a compound of a metal of Group II of the Periodic Table in the presence of water or an acid to prepare a novel, partly or wholly neutralized polyolefin wax (hereinafter being sometimes referred to as product wax), and by emulsifying the acid-modified polyolefin wax or the novel polyolefin wax, together with suitable additives if desired, in water to prepare an aqueous polishing emulsion.

The polyolefins or polyolefin waxes which may be used in the practice of this invention, may be obtained by pyrolyzing a high molecular plastics-like or rubbery polyolefin or by polymerizing or telomerizing an olefin or olefins having preferably 2 - 4 carbon atoms, to the extent that the resulting polyolefins have a preferable average molecular weight (400 - 1,500). It is advantageous from the industrial view-point, however, that they may be obtained from by-products produced when preparing high molecular weight plastics-like polyolefins.

In view of the fact that the polyolefins should preferably be those which may easily react and easily controllably react with ethylenically unsaturated dibasic acids or anhydrides thereof, it is desirable to use in the invention polyolefins having the desired molecular weight range (400 - 1,500) produced as by-products in the practice of so-called "Standard Process" for producing polyolefins. The "Standard Process" described herein is disclosed in Japanese Patent Gazettes Nos. 4095/58 and 22589/64 and is summarized as follows.

The Standard process is a process for polymerizing or copolymerizing olefins at elevated temperatures in the presence of a catalyst selected from the group consisting of:

(a) oxides of metals of Groups V$a$ and VI$a$ of the Periodic Table, as well as metals of Groups I and III and their alloys, hydrides, organometals and mixtures thereof, each being supported on a carrier, (b) metals prepared by reducing the same metal compounds as those of said paragraph (a) in which the metal is selected from the metals of Groups V$a$ and VI$a$, and (c) metals of said paragraph (b), further treated with a hydrogen halide.

The starting polyolefin waxes which may preferably be used in this invention include polyethylenes, polypropylenes, ethylene-propylene copolymers and mixtures thereof, each having an average molecular weight of 400 - 1,500.

The ethylenically unsaturated dibasic acids and the anhydrides thereof which may be used in the invention, include maleic, fumaric, citraconic, itaconic and glutaconic acids, and maleic and citraconic anhydrides, with maleic acid and anhydride thereof being preferred.

The reaction conditions under which the starting polyolefin wax is reacted with the ethylenically unsaturated dibasic acid or the anhydride thereof, may be determined depending on the molecular weight of the starting polyolefin wax used and the kind of the acid or anhydride thereof used; as to the reaction temperature, it should be in the range of 150° – 300° C, preferably 150° – 250° C.

The starting polyolefin waxes used herein should be those having an average molecular weight of 400 – 1,500. If polyolefin waxes having an average molecular weight of less than 400 are used as the starting wax, they will be too soft and lose their luster when reacted with the dibasic acid to introduce the carboxyl groups thereinto, thereby to make them useless as a product wax. On the other hand if polyolefin waxes having an average molecular weight of more than 1,500 are used as the starting wax, the resulting product waxes will have a higher melting point and too high a melt viscosity thereby to make them deteriorated in workability at the time of being handled in the molten form; furthermore, if they are to be provided with a suitable emulsification susceptibility, they will have to be treated under severe reaction conditions to introduce the carboxyl groups in excess thereinto, this having adverse effects on the luster, color and the like of the resulting produce waxes.

When there are used as the starting wax polyolefin waxes obtained by the decomposition of high molecular weight polyolefins or by the medium pressure or low pressure method, or the like, they may be reacted with the acid in the presence of a radical initiator or the like since they are less reactive.

The product polyolefin waxes contemplated by this invention are those which are comparable or superior to carnauba wax in emulsification susceptibility, that is capability of being emulsified. To this end, the starting polyolefin waxes were found to have to be reacted with the acid to the extent that the resulting acid-modified wax exhibits a saponification value or number of 30 or higher. However, acid-modified polyolefin waxes of an unduly high saponification number will be unsatisfactory in heat stability, color, luster and the like; thus, the saponification number of the novel product waxes of this invention should be in the range of 30 – 120, preferably 50 – 90.

Accordingly, the most preferable acid-modified waxes may be obtained by reacting a polyolefin wax having an average molecular weight of 300 – 5,000, preferably 400 – 1,500 produced by the so-called Standard Process, the polyolefin wax being illustrated by an ethylene homopolymer or an ethylene-propylene copolymer, with maleic anhydride at temperatures of 150° – 250° C and at pressures of atmospheric pressure to 10 kg/cm$^2$, preferably atmospheric pressure to 5 kg/cm$^2$, and the acid-modified waxes so obtained have a suitable saponification number.

According to this invention, the acid-modified polyolefin waxes may further be reacted either with a polyhydric alcohol having preferably 2 – 4 carbon atoms or with a metal compound in which the metal is selected from the group consisting of the metals of Group II of the Periodic Table, to esterify or neutralize part or all of the carboxyl groups contained in the acid-modified waxes. The intermolecular bridging or cross-linking reaction also takes place during said esterification or neutralization thereby to provide product waxes which retain the same emulsification susceptibility as the acid-modified waxes, have a melting point and melt viscosity respectively not higher than those of the acid-modified waxes and possess satisfactory hardness and luster.

The polyhydric alcohols having preferably 2 – 4 carbon atoms used herein include ethylene glycol, propylene glycol, butanediol and glycerine, with dihydric alcohols having 2 – 4 carbon atoms or mixtures thereof being preferred.

In this connection, the use of a monohydric alcohol for such neutralization will not give product waxes having satisfactory hardness and luster. Said neutralizing reaction may be carried out as usual but may preferably be effected at 120° – 200° C in the presence of a suitable catalyst such as a cation exchange resin, mineral acid or p-toluenesulfonic acid, thereby allowing the reaction to proceed easily; after the completion of the reaction the unreacted polyhydric alcohol may be distilled off if desired. The polyhydric alcohols used herein may be used in amounts of 0.2 – 1 times the equivalent to each carboxyl group contained in the acid-modified wax thereby to provide a product wax having a satisfactorily high hardness.

As previously mentioned, the acid-modified polyolefin waxes may alternatively be neutralized with a metal compound in which the metal is selected from the metals of Group II of the Periodic Table.

Heretofore, it has been considered difficult to obtain an alkaline earth metal salt of acid-modified polyolefin waxes and, in fact, oxygen-containing or oxidized polyolefin waxes only in an aluminum or zinc salt form are now available from the market while those in an alkaline earth metal salt form are not. In addition, the aluminum- or zinc-containing oxidized waxes are usually obtained by converting the acid-modified waxes once to those in the form of an alkali metal salt such as sodium salt, followed by being subjected to an ion exchange reaction.

The process using the metal compound as the neutralizing agent according to the invention, unlike said conventional complicated process, is also a simple process for preparing novel polyolefin waxes having many excellent properties. In this simple process using the metal compound, the acid-modified polyolefin wax is melted and then reacted with at least one metal compound in which the metal is selected from the group consisting of the metals of Group II of the Periodic Table, the metal compound being illustrated by the oxide or hydroxide of calcium, magnesium or zinc, or calcium carbonate, thereby to produce a novel metal-containing polyolefin wax. The reaction may preferably be carried out in the presence of water or a volatile acid as the catalyst. Like the case with the conventional aluminum- or zinc-containing oxidized polyolefin waxes as previously stated, a calcium-containing polyolefin oxidized wax was tentatively prepared by reacting the acid-modified polyolefin wax with sodium hydroxide for example to convert said acid-modified wax to the calcium-containing wax; in this case, however, it was found that the sodium incorporated into the product wax was difficult to remove fully by washing away therefrom and the portion of the sodium remaining in the product wax after the washing caused the product wax to be deteriorated in stability of color due to the presence of the calcium therein as well as in other properties, this being disadvantageous.

According to the process of this invention, however, such foreign matter such as said residual sodium may be prevented from being incorporated in the product wax to be obtained, and the product wax obtained has a high hardness and may be finely pulverized with the use of a hammer, metal brush or the like. Thus the process of this invention may give qualitatively well-controlled product waxes which are excellent in surface smoothness, luster and the like.

The metal-containing polyolefin waxes of this invention may be prepared by melting the acid-modified polyolefin wax and reacting the wax so melted with a metal compound in which the metal is selected from the metals of Group II of the Periodic Table, in the presence of water or an volatile acid as the catalyst.

The volatile acids which may preferably be used include strong acids such as hydrochloric and nitric acids; formic acid or the like are also preferable. The reaction between the acid-modified polyolefin wax and at least one metal compound may be carried out at temperatures of preferably 100° – 200° C at atmospheric or elevated pressure, more preferably 120° – 180° C at atmospheric pressure.

If the catalyst is distilled off from the reaction system after its participation in the reaction, undesirable side reactions will not take place, the side reactions being such as the decomposition of a metal salt of the acid-modified wax, accompanied by the generation of free carboxyl groups, thus making it possible to inhibit the wax from being emulsified. Thus, the catalyst may gradually be added to the reaction system while gradually distilling off the used catalyst to the outside of the reaction system or may be used in small amounts with aid of a suitable refluxing unit to complete the reaction. It is desirable from the view-point of entire removal of the catalyst that after the completion of the reaction, the reaction mixture should be heated for a sufficient time or heated with agitation under reduced pressure. The amount of a metal compound which may be used in the neutralizing step of this invention is not more than an amount equivalent to the acid value of the acid-modified polyolefin wax used from which acid value the saponification value of said wax is calculate. The use of the metal compound in excess will result in producing product waxes in which some of the metal compound used remains as the unreacted matter thereby deteriorating the resulting product waxes in luster, surface smoothness and the like, while the use of the metal compound in an unduly small amount will result in producing free carboxyl groups in more amounts and in emulsifying the wax during heating, thereby making it difficult to obtain a satisfactory product wax. The use of 1/5 – 1 equivalent of the metal compound to the acid value of the acid-modified wax will result in the production of a product wax which is well-balanced in hardness and other properties.

The product waxes or oxygen-containing waxes obtained by neutralizing the acid-modified polyolefin wax with the polyhydric alcohol or with the metal compound in the presence of water or the volatile acid, have various excellent properties such as satisfactory emulsion susceptibility and are suitable for use in preparing an emulsion thereof in water or an organic solvent (the emulsion being useful as a polishing agent or the like) since they may form a coating or film having satisfactory strength and luster when used in their emulsion form to form the coating. They may also be used as material for precise casting and as lubricants, additives for improving paraffin in quality, and the like. They may further be mixed with suitable oils such as lubricating oil fractions, kerosine or light oil to form coating or polishing agents for use in the preparation, for example, carbon paper, shoe black, crayon, colored pencils and various polishing materials.

For the sake of explanation, the acid-modified polyolefin wax, the product wax obtained by esterification (or neutralization) with the polyhydric alcohol, and the product wax obtained by neutralization with the metal compound are hereinafter sometimes referred to as "product wax (I)", "product wax (II)" and "product wax (III)", respectively.

This invention relates also to aqueous emulsions for polishing. The aqueous polishing emulsions are characterized by containing any one of the novel product waxes (I), (II) and (III).

Heretofore, it has been necessary from the view-point of appearance and protection to repeatedly polish articles such as the floors of a building which are made from lumber, tiles, plastics and the like; furniture which is made from lumber, metal and plastics; the outer surface of car bodies; and the like. The custom of such polishing is gradually more remarkable as the standard of civic life is enhanced. In order to polish these articles there are mainly used aqueous emulsions containing wax as one of the main components and, as such wax, carnauba was is a natural wax is generally used. Carnauba wax has long been popularly used since it may easily be emulsified in water and, when used in an emulsion form, may polish articles to give satisfactory luster thereto. This wax, however, will not necessarily give sufficiently strong coatings or films thereof and has recently been short of its supply. Thus substitutes for carnauba wax have been sought, and product waxes (I) – (II) of this invention have been provided as such substitutes. Aqueous polishing emulsions containing any one of the product waxes (I) – (III) were each coated on a wood piece, tile and metal in an attempt to give these articles luster or polish, and they exhibited satisfactory results.

The conventional oxidized waxes which are among the conventional synthetic resins are synthesized by air oxidation and, therefore, they necessarily contain a minute amount of degraded organic materials with an offensive odor being inevitably somewhat emitted. This offensive odor is remarkable particularly when the oxidized wax is melted for coating operations, and this has raised a very undesirable problem from the view-point of operational environments. On the other hand, the product waxes of this invention eliminate the aforesaid drawbacks. It has been found that the product wax (I) which is an oxygen-containing or oxidized wax, is the same in many of its properties as the conventional oxidized wax and is quite odorless or somewhat fragrant even at ambient temperatures and even when melted at high temperatures.

In order that waxes may have satisfactory emulsion susceptibility (or susceptibility to emulsification), they should have an oxygen content expressed in terms of a saponification number of at least 20; to this end, it is required that at least 1.78 g of maleic anhydride (when maleic anhydride is used as the unsaturated dibasic acid or anhydride thereof) be used per 100g of the starting polyolefin wax according to this invention.

For instance, when maleic anhydride is subjected to a usual thermal reaction with the polyolefin wax without the use of the catalyst, radical initiator, oxidizer and the like, it will react with the double bonds of the wax in the ratio of 1 : 1. Thus, in order to permit maleic anhydride to react in a ratio greater than said ratio, the polyolefin wax to be reacted with the anhydride should theoretically have double bonds in an amount expressed in terms of a bromine number of at least 2.9, preferably at least 4. The above may be explained using equations as shown hereinunder.

Saponification value or number

= KOHmg(required for saponification)/wax g  (1)

When Mg of maleic anhydride (molecular weight: 98) is reacted with every 100g of the starting polyolefin wax to introduce thereinto the carboxyl groups each of which is capable of reacting with two molecules of KOH, the saponification number S of the resulting reaction product will be:

$$S = \frac{\frac{M}{98} \times 56 \times 2 \times 1,000}{100 + M} \quad (2)$$

The equation (2) may be rewritten as shown below:

$$M = \frac{100}{\frac{1,140}{S} - 1} \quad (3)$$

As will be apparent from a S-M graph if it is drawn, in order to permit $S \geqq 20$, M must be as follows:

$$M \geqq 1.78g \quad (4)$$

If M grams of maleic anhydride be reacted with the double bonds of the starting polyolefin wax in a ratio of 1 : 1 and since the estimation of bromine number of said wax indicates that two bromine atoms are reacted with every one of the double bonds, the bromine number B will be:

$$B = (M/98) \times 80 \times 2 \quad (5)$$

To satisfy the condition $M \geqq 1.78$, B must be:

$$B \geqq 2.9 \quad (6)$$

From the results obtained by carrying out maleinising or maleinating reactions under various conditions, it was found that maleinisation or maleination on the double bonds of the starting wax will not attain 100%. Therefore, it was also found that the starting polyolefin wax should retain double bonds in an amount expressed in terms of bromine number of at least 4 to provide the resulting acid-modified polyolefin wax that is, product wax (I) with satisfactory emulsification susceptibility.

An aqueous emulsion containing the product wax (I), together with or without paraffin, in the total amount of 11% by weight was prepared and tested for its properties or performance as a polishing agent with the result that it exhibited approximately the same performance in all aspects as carnauba wax and also exhibited it had satisfactory emulsification susceptibility, luster and other important features as compared with the typical conventional oxidized waxes.

However, since the product wax (I) is one which is prepared using the starting polyolefin wax of a low molecular weight, it is excellent in melting point, melt viscosity and the like while it may sometimes be not fully satisfactory in hardness and luster depending on the purpose for which it is used. Even in the case where a greater hardness and a better luster are required in the wax, the product waxes (II) and (III) may successfully be used. These novel waxes (II) and (III) may be emulsified by conventional emulsifying methods now in general use. Furthermore, the wax (III) may also be emulsified by adding the wax in a molten form to a boiling water, and vice versa.

To prepare a product wax (III) which is capable of giving preferable emulsions, the amounts of the typical metal compounds to be used with respect to the acid-modified polyolefin wax (product wax (I)) having a saponification number of S should be as follows.

| | |
|---|---|
| MgO | 0.00714 S – 0.0358 S wt% |
| Mg(OH)$_2$ | 0.0106 S – 0.0516 S wt% |
| CaO | 0.00991 S – 0.0496 S wt% |
| Ca(OH)$_2$ | 0.0131 S – 0.0655 S wt% |
| ZnO | 0.0144 S – 0.0720 S wt% |
| Zn(OH)$_2$ | 0.0176 S – 0.0880 S wt% |

These correspond to the amounts necessary to convert one-fifth or all of the carboxyl groups in the acid-modified wax to the corresponding salts respectively, the amount of the carboxyl groups being calculated from the saponification number of said wax.

In the preparation of aqueous polishing emulsions of this invention, the product wax (I), (II) or (III) may be added, if desired, together with paraffin, an emulsifier and resins for levelling which are materials used in the conventional polishing emulsions, to water to the extent that the resulting emulsion contains 4 – 35% by weight of all the effective ingredients. All the effective ingredients approximately correspond to all the said matter and they are intended herein to include additives such as emulsifiers whether solid or liquid.

The amount of paraffin which may be used is 0 – 5 times the amount of the product wax (I), (II) or (III) used.

The emulsifiers used herein include oleic acid, morpholine and other generally-used ones, and these may be used singly or jointly in the amounts of 3 – 30% by weight based on the product wax of this invention.

As to the resins for levelling, an emulsion of such resin (illustrated by a resin supplied under the trade mark of Sumilite Resin by Sumitomo Chemical Industrial Co., Ltd.) in ammonia water may be added to the product wax of this invention to the extent that the amount of the resin is 0.3 – 3 times that of the wax in the resulting polishing emulsion.

This invention will be better understood by the following examples wherein all parts and percentages are by weight unless otherwise specified.

(A) Preparation of starting polyolefin waxes for illustration:

A catalyst consisting of γ-alumina as the carrier and molybdenum oxide carried thereon (the catalyst containing 22% by weight of MoO$_3$) was reduced in a hydrogen stream at 400° C for one hour. Two kilograms of a catalytic system consisting of the catalyst so obtained and an equivalent of metallic sodium thereto, were suspended in one cubic meter (1 m$^3$) of n-decane. The suspension so obtained was transferred into a reactor, heated to 275° C and incorporated with ethylene fed under 70 kg/cm$^2$ for two hours thereby obtaining 90 kg of high molecular polyethylenes and 10 kg of waxy compounds. The waxy compounds were filtered off, freed from the used catalyst, extracted with n-hexane to obtain an extract in the n-hexane which was then subjected to multi-step distillation to obtain 10 kg of waxy substances having a molecular weight of 400 – 1,500.

EXAMPLE 1

Eighty grams of the polyolefin wax (the properties being indicated in Table 1) obtained in said Preparation (A) were heated to 180° C in a nitrogen stream and incorporated with 20 g of maleic anhydride under agitation, to react the wax with the anhydride. After the completion of incorporation with the acid, the reaction was continued for 6 hours and thereafter the reaction mixture was distilled at a temperature of 140° C and a reduced pressure of 30 mm Hg thereby to obtain light-yellow waxy substances.

Table 1

| | |
|---|---|
| Average molecular weight | 475 |
| Melt drop point (ASTM 127) | 112.5° C |
| Melt viscosity (B type viscosimeter) | 23.0cp/135° C |
| Amount or Number of double bond (per 1000 Carbon) | 23 |

EXAMPLE 2

3.2 kg of the starting polyethylene wax (average molecular weight: 633) obtained in said Preparation (A) and 350 g of maleic anhydride were charged in a 5-liter autoclave and heated to 180° C. The resulting mixture was further heated under agitation to 240° C at a temperature-raising rate of 0.5° C/min and agitated for an additional 4 hours. After the end of the reaction the reaction mixture was freed of the unreacted maleic anhydride by the distillation-off thereof at 150° C and under 10 – 20 mm of mercury, leaving a light yellow-colored maleinated wax as the residue. The properties of the wax so obtained are indicated in Table 2.

Table 2

| | Starting polyethylene wax | Maleinated polyethylene wax |
|---|---|---|
| Average mol. wt. | 633 | 675 |
| Penetration degree* | 13.5 | 8.5 |
| Melting point (° C)** | 89 | 89 |
| Bromine number*** | 13 | 9 |
| Saponification number**** | 0 | 81 |

*ASTM D 1321-70
**ASTM D 127-63
***ASTM D 1158-59 according to which Br. Nos. determined.
****ASTM D 1387-59

It was found that in this Preparation, 96% of the double bonds in the starting polyethylene and 70% of the maleic anhydride participated.

COMPARATIVE EXAMPLE 1

Approximately the same starting polyethylene wax as used in Example 2 was hydrogenated in the presence of a Ni-Mo-Al$_2$O$_3$ catalytic system by the use of a usual method to saturate almost all of the double bonds contained in said wax, thus obtaining a hydrogenated wax having a bromine number of 0.7. Two hundred grams of the hydrogenated wax and 40 g of maleic anhydride were charged in a 600-c.c. autoclave and, after purging the reaction system with nitrogen, heated to 225° C under agitation for 8 hours. The reaction product in a molten state was transferred into a beaker where it was separated into a yellow-colored upper layer and a black-colored lower layer in a small amount. These two layers were respectively distilled at 120° C and 5mm of mercury for 4 hours to remove therefrom the unreacted maleic anhydride and then subjected to various analyses with the results being as shown in Table 3.

Table 3

| | Color | Ratio of amount | Infra-red absorption | Bromine number | Mol. wt. | Saponification number |
|---|---|---|---|---|---|---|
| Hydrogenated polyethylene wax (the whole) | White | | There remained minute amount of the same vinylidene absorption as usual polyethylenes. | 0.7 | 570 | 0 |
| Upper layer | Yellow | about 10 | " | — | 570 | 4.1 |
| Lower Layer | Black-brown | about 1 | Approximately the same as maleic anhydride | — | 680 | 114 |

The material of the lower layer was soluble in warmed acetone and insoluble in heated toluene. From the above results it is considered that a polyethylene having a low bromine number will not react with maleic anhydride at elevated temperatures and maleic anhydride will, per se, be telomerized under said reaction conditions to produce black-colored non-volatile materials. However, if these materials are those euqivalent to maleic anhydride they would necessarily have a saponification number of as high as 1,140. The saponification number of as low as 114 indicated in the Table is supposed to indicate that the lower layer was not sufficiently separated from the polyethylene used.

EXAMPLE 3

One hundred and fifty grams of a copolymer of ethylene and propylene in the molar ratio of 93 : 7 (the properties of the copolymer being shown in Table 4) and 20g of maleic anhydride were charged in a 600-c.c. autoclave and, after filling nitrogen at 3 kg/cm$^2$ G into the autoclave, reacted together at 200° C for 6 hours. The reaction product obtained after the removal of the unreacted maleic anhydride, had the properties as shown in the following Table 4.

Table 4

| | Average mol.wt. | Penetration degree | Melting point | Bromine number | Saponification number |
|---|---|---|---|---|---|
| Starting polyolefin (copolymer) | 660 | 19 | 117° C | 17 | 0 |
| Product wax | 730 | 16 | 118° C | — | 68 |

Regarding the bromine number, the oxygen-containing wax or products wax was not tested for bromine number because it does not exhibit any significant number or value due to side reactions taking place. This applies to the following Examples and Comparative examples.

EXAMPLE 4

Three kilograms of the product wax (I) having a saponification number of 85 obtained by the same process as in Example 2 were charged in a 5-liter autoclave, and then 160 g of ethylene glycol were slowly charged in the same autoclave while agitated at 150° C in a nitrogen atmosphere, followed by being agitated for a further two hours. After the end of the reaction the unreacted ethylene glycol was distilled off at a temperature of 150° C and a reduced pressure of 5 mm of mercury, and an esterified polyethylene wax (product wax (II)) was obtained as the residue. The maleinated wax used and the esterified wax obtained were measured for their infra-rod absorption spectra with the result that, on one hand, there disappeared entirely the absorptions at 1790 cm$^{-1}$ and 1860 cm$^{-1}$ previously caused by the cyclic acid anhydride and, on the other hand, there appeared an absorption at 1730 cm$^{-1}$ caused by the esterification bond and an absorption at 1710 cm$^{-1}$ caused by the free carboxyl group. This indicates that the acid anhydride caused its ring cleavage and was converted to the corresponding half ester, and suggests that the maleinated wax was converted to the product wax in which the bridging was effected by the ethylene glycol in view of a change in molecular weight between said two waxes. As compared with the maleinated wax, the product wax was not so much increased in melting point and melt viscosity in spite of the great improvement in hardness expressed in terms of penetration degree and had satisfactory luster. The maleinated wax used and the product wax obtained had the properties as shown in the following Table 3.

Table 5

|  | Maleinated wax | Product wax |
| --- | --- | --- |
| Average mol. wt. | 640 | 1120 |
| Penetration degree | 9.0 | 2.0 |
| Melting point (° C) | 87 | 87 |
| Melt viscosity* (cp) |  |  |
| 120° C | 14 | 30 |
| 150° C | 7 | 15 |

*Melt viscosity : Measured with B type viscosimeter

COMPARATIVE EXAMPLE 2

The procedure of Example 4 was followed except that the ethylene glycol was substituted by each of 2-ethyl hexanol and cyclohexanol which were a monohydric alcohol, thereby to obtain the corresponding ester. The esters so obtained were tested for hardness expressed in terms of penetration degree, and the results are shown in Table 6 from which it is found that the use of monohydric alcohols will not increase the resulting esterified wax in hardness.

Table 6

| Wax | Penetration degree |
| --- | --- |
| Maleinated wax | 9.0 |
| Ethylene glycol-esterified wax | 2.0 |
| 2-ethyl hexanol-esterified wax | 20.0 |
| Cyclohexanol-esterified wax | 8.0 |

EXAMPLE 5

One hundred parts of a maleinated wax (saponification number: 68) obtained by reacting an ethylene-propylene copolymer (average mol. wt.: 720) with maleic anhydride in the same manner as in Example 2, were reacted with 4.0 parts of propylene glycol at 170° C in the same manner as in Example 4. After the end of the reaction, the reaction mixture was freed of the unreacted propylene glycol by distilling it off thereby to obtain an esterified wax as the residue. The esterified wax so obtained exhibited a penetration degree of 2.5 indicating a greatly increased hardness in view of the fact that the starting maleinated wax had a penetration degree of 11.0.

EXAMPLE 6

A one-liter flask was charged with 500 g of the same maleinated wax (saponification number: 85) as used in Example 4 and then four times with 3 g (total: 12 g) of ethylene glycol while agitating at 150° C. Each time the 3 g of ethylene glycol was charged, the reaction was continued for one hour. Thereafter, the unreacted ethylene glycol was distilled off from the thus-obtained reaction mixture at 150° C and 2 mm Hg to the extent no volatile matter was confirmed. The glycol-free reaction mixture was then measured for infra-red absorption spectra and penetration degree.

The total amount of ethylene glycol used in this Example was equal to the amount necessary to esterify all the carboxyl groups in the maleinated wax (saponification number: 85) used.

From the results on infra-red absorption spectra it was found that the esterifying reaction proceeded quantitatively. Table 7 shows a relation between the ratio in equivalent of the carboboxyl group-reacted ethylene glycol to all of the original carboxyl groups and the penetration degree of the product wax.

Table 7

| Ratio in equivalent | 0 | 1/4 | 2/4 | 3/4 | 4/4 |
| --- | --- | --- | --- | --- | --- |
| Penetration degree | 9.0 | 5.0 | 3.0 | 2.0 | 2.0 |

Furthermore, the product wax in which all the carboxyl groups have been esterified is compared with commercially available waxes for properties as shown in Table 8.

Table 8

|  | Esterified wax of this invention | Carnauba wax No. 1 | Oxidized* wax (commercially available) | Polyethylene* wax (Commercially available) |
| --- | --- | --- | --- | --- |
| Color | Light brown | Yellow | White | White |
| Odor | Slightly fragrant | Fragrant | Offensive odor | Odorless |
| Average mol.wt. | 1120 | 755 | 780 | 1500 |
| Melting point (° C) | 87 | 86 | 100 | 105 |
| Penetration degree | 2.0 | 1.0 | 2.0 | 2.0 |
| Melt vis- |  |  |  |  | equivalent calculated from said saponification number, respectively, the calcium chloride being in the form of a 30% aqueous solution thereof. The resulting mixtures were each heated at 160° C for 3 hours and were each tested for penetration. The results are indicated in FIG. 2. This figure shows a relation between calcium contents and the hardnesses of the calcium-containing waxes. It was found from this figure that when the ratio in equivalent of calcium to the carboxyl groups in the waxes attain to 1/5 (0.2), the hardness of the waxes was sufficient, and that as the ratio increased beyond 1/5 the hardness slowly increased. This was also true with a calcium carbonateformic acid system, a calcium hydroxide-nitric acid system and the like as a neutralizing agent for the maleinated waxes.

COMPARATIVE EXAMPLE 3

The same maleinated polyethylene wax as indicated in Example 7 was melted and incorporated with powdered calcium oxide in an amount of 1.5 times the equivaelnt calculated from the saponification number of the wax to form a mixture which was then heated to 130°- 160° C under agitation for 3 hours. Then the agitation was stopped to allow the reaction mixture to stand still thus precipitating the powdered calcium compound. It was found that the melted wax present in the upper layer was approximately the same in various properties as the starting maleinated wax, and that the infra-red absorption spectra showed hardly any calcium was combined with the maleinated wax. In addition, the calcium compound-added wax was remarkably inferior in penetration degree, pulverizability, surface gloss and the like to the calcium-containing waxes obtained in Example 7, 8, 9 and 10. The same experiment as above was made except that calcium hydroxide was used. The result is that the wax so obtained was very far inferior to the calcium-containing waxes obtained in Examples 7 – 10.

EXAMPLE 11

The product wax (I) obtained in Example 2 was compounded with the ingredients as indicated by the following formulation and then easily emulsified. A portion of the emulsion so obtained was allowed to stand still at 40° C for 24 hours, and another portion of the emulsion was subjected to a temperature of −10° C for 8 hours to be freezed and, after freezed, melted; this cycle was further two times repeated. The result is that these two portions did not exhibit gelling, wax separation and the like. The emulsion also did not exhibit wax separation even after having been subjected to centrifugation at 3,000 rpm for 5 minutes.

| The product wax of Example 2 | 6 | wt.% |
| --- | --- | --- |
| 140° F paraffin | 5 | |
| Oleic acid | 1.5 | |
| morpholine | 1.5 | |
| Levelling agent | 11 | |
| Water | 75 | |

The emulsion was coated on wood pieces, polyvinyl chloride-made tiles, glass and the outer surface of car bodies to form a coating thereon. The coatings so formed were observed or tested for their properties with the result that their over-all performances or qualities were graded in terms of numerals 1 to 5 with numeral 1 indicating the worst and numeral 5 the best (the grading being hereinafter referred to as "five grades estimation") as shown in Table 9.

COMPARATIVE EXAMPLE 4

Carnauba wax No. 2, the oxidized wax of Example 6 and other ingredients as shown in the following formulation were together mixed and emulsified. The emulsion so obtained was tested for the same items as in Example 11. The results are shown in Table 9.

| Carnauba wax No. 2 | 3 | wt.% |
| --- | --- | --- |
| Oxidized wax | 3 | |
| 140° F paraffin | 5 | |
| Oleic acid | 1.5 | |
| Morpholine | 1.5 | |
| Levelling agent | 11 | |
| Water | 75 | |

COMPARATIVE EXAMPLE 5

The procedure of Comparative example 4 was followed except that the carnauba wax No. 2 was excluded and substituted therefor the same oxidized wax as used in the Comparative example 4 (that is, 6 wt.% of the oxidized wax was used as the only wax). The emulsion obtained was tested for the same items as in Example 11 to effect the "five grades estimation". The results are indicated in Table 9b.

Table 9a

Estimation of Performance of Polishing Emulsions (Five Grades Estimation)
[5 (best) – 1 (worst)]

| | Example 11 | Comparative Example 4 | Comparative Example 5 |
| --- | --- | --- | --- |
| Heat stability | 5 | 5 | 5 |
| Freeze-Melt stability | 5 | 5 | 4 |
| Polish film (Color, cloudiness and crack of coating on glass) | 5 | 5 | 4 |
| Luster | 5 | 5 | 3 |
| Levelling performance | 5 | 5 | 5 |
| Removability | 5 | 5 | 4 |
| Pulverizability | 5 | 5 | 5 |
| Black heel mark | 4 – 5 | 5 | 5 |
| Scuff mark | 5 | 5 | 5 |
| Anti-slip performance | 4 | 4 | 5 |

From the above it was found that the product wax obtained in Example 2 was approximately comparable to carnauba wax (which is naturally occurring) as the main ingredient for polishing emulsions, and that said product wax not only gave excellent stability, luster and the like to emulsions when used in the preparation of the emulsions but also was excellently workable when treated.

EXAMPLE 12

Three kilograms of a maleic anhydride-modified polyethylene (saponification number: 85) as the starting modified wax were introduced into a 5-liter autoclave and, after purging the reaction system with nitrogen, incorporated slowly with 160 g of ethylene glycol over a time period of 20 minutes while heating to 150° C under agitation. The resulting mixture was agitated for an additional two hours and thereafter it was distilled at 150° C and 5 mm Hg for 3 hours to remove the unreacted ethylene glycol therefrom. The starting acid-modified wax (product wax (I)) and the esterified wax (product wax (II)) had the properties as shown in the following Table 10.

Table 8-continued

|  | Esterified wax of this invention | Carnauba wax No. 1 | Oxidized* wax (commercially available) | Polyethylene* wax (Commercially available) |
|---|---|---|---|---|
| cosity (cp) | | | | |
| 120° C | 30 | 14 | 75 | 400 |
| 150° C | 15 | 7 | 40 | 180 |

*A part of the data on the commercial goods are based on the catalogues for said goods.

From the above Table it is clear that the esterified waxes of this invention are equal in properties to carnauba wax No. 1 and are far superior in properties to the commercially available waxes.

EXAMPLE 7

Figure 1B:
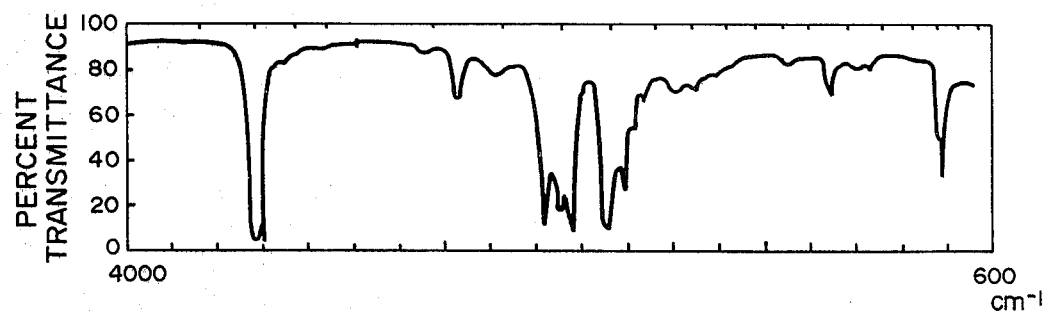

One hundred parts of a polyethylene wax (average mol. wt.: 600) obtained by the same process as used in the Preparation (A) and 11.5 parts of maleic anhydride were charged in an autoclave in the same manner as in Example 1 and reacted together at 235° C for 6 hours in a nitrogen atmosphere, after which the unreacted maleic anhydride was distilled off at 150° C and 2 mm Hg thus obtaining a maleinated polyethylene wax. Then, 100 parts of the maleinated wax so obtained were melted and incorporated with 8.4 parts of calcium chloride and 20 parts of water at 160° C under atmospheric pressure to form a mixture which was agitated for two hours, thus obtaining a calcium-containing polyethylene wax (product wax (III)). The progress or proceeding of the neutralizing reaction was able to be confirmed by measuring the reaction mixture being reacted for infra-red absorption spectra (refer to FIGS. 1A and 1B). Referring to these figures, the maleinated polyethylene wax exhibited two specific absorptions at 1860 cm$^{-1}$ and 1790 cm$^{-1}$ caused by the maleic anhydride groups thereof without other absorptions found in the absorption region for carbonyl groups. In contrast, the neutralized wax exhibited an absorption at 1710 cm$^{-1}$ caused by carboxylic acid and an absorption at 1500 - 1600 cm$^{-1}$ caused by carboxylic acid ion.

The neutralized wax, that is the calcium-containing polyethylene wax so obtained was one prepared by carrying out bridging or crosslinking in the maleinated polyethylene wax, and had high hardness and satisfactory luster. The results are shown in Table 9.

Table 9

|  | Polyethylene wax | Maleinated polyethylene wax | Calcium-containing polyethylene wax |
|---|---|---|---|
| Average mol. wt. | 600 | 675 | 1,380 |
| Experimental formula | $C_{100}H_{200}$ | $C_{100}H_{200}O_{4.2}$ | $C_{100}H_{200}O_{4.9}Ca_{0.78}$ |
| Amount of carbon-carbon* double bonds (per 100 carbon atoms) | 1.7 | 1.2 | 1.2 |
| Amount of chlorine ion** | 0 | 0 | 0 |
| Saponification value | — | 85.1 | 89.0 |
| Penetration degree*** | 13.0 | 8.5 | 0 |
| Softening point, ° C | 87 | 93 | 95 |
| Melting point, ° C | 85 | 88 | 91 |

*Determined in accordance with ASTM D1158-59.
**Determined by analysis of Cl$^-$ in Cl extract in water.
***ASTM D1321-70

EXAMPLE 8

One hundred grams of the same maleinated polyethylene wax as used in Example 7 were melted and incorporated with 5.6 grams of powdered calcium hydroxide (equivalent to the amount of carboxyl groups and calculated from the saponification number of the maleinated wax) and 0.1 equivalent of hydrochloric acid, that is 12cc of 1.3-Normal solution of hydrochloric acid, to form a mixture which was heated under reflux at 150° C for two hours under atmospheric pressure. The product exhibited the same infra-red absorption spectra as that obtained in Example 7 and was found to be a calcium salt of the maleinated wax, that is a product wax (III). This product exhibited a penetration degree of zero which means a very high hardness, and had metallic luster; furthermore, it was able to be crushed with a hammer or finely divided by rubbing with a metal brush and was also able to be made a liquid having low viscosity by heating.

EXAMPLE 9

Following the same procedure as Example 7, there were together mixed 50 grams of a maleinated wax (saponification number: 75) prepared by reacting a low molecular weight ethylene-propylene copolymer (average mol. wt., 620; melting point, 84.5° C; amount of inter-carbon double bonds, 21.2; penetration degree, 21) with maleic anhydride, 3g of calcium hydroxide and 5c.c. of a 1-N solution of formic acid (the amount of formic acid being equal to 0.05 times the equivalent per calcium atom). The resulting mixture was heated to 160° C under agitation for two hours thereby to obtain a calcium-containing polyethylene wax (product wax (III)). From the spectra for this product wax it was confirmed to be in the form of a calcium salt. Furthermore, this product wax exhibited a penetration degree of zero and satisfactory hardness and was approximately the same in absorption feature as those obtained in Examples 4 and 8.

EXAMPLE 10

Following the procedure of the Preparation (A), there was obtained a polyethylene wax having an average molecular weight of 650. The wax so obtained was then maleinated in the same manner as in Example 7, and the wax so maleinated had a saponification of 80. Portions of the maleinised wax were melted and slowly incorporated at 160° C under atmospheric pressure with calcium chloride in amounts of 1/10 - 10/10 of the Table 10

|  | Average mol.wt. | Penetration degree | Melting point | Melt viscosity 120° C | Melt viscosity 150° C |
| --- | --- | --- | --- | --- | --- |
| Product wax (I) | 640 | 9.0 | 87° C | 14cp | 7cp |
| Product wax (II) | 1,120 | 2.0 | 87° C | 30cp | 15cp |

COMPARATIVE EXAMPLE 6

The same maleinated polyethylene wax (product wax (I)) as used in Example 12 was reacted with each of 2-ethyl hexanol and cyclohexanol under the same operational conditions as in Example 12. Each of the waxes thus obtained had the following hardness expressed in terms of penetration degree as shown in Table 11.

Table 11

|  | Starting product wax (I) | Ethylene glycol ester | 2-ethyl hexanol ester | Cyclohexanol ester |
| --- | --- | --- | --- | --- |
| Penetration degree | 9.0 | 2.0 | 20.0 | 8.0 |

The infra-red absorption of the waxes obtained indicated that all of the carboxyl groups in the wax were half esterified. From the above, it is apparent that the increase in hardness of the waxes is due to the bridging reaction, not the esterification reaction.

EXAMPLE 13

Five hundred grams of the same maleinated polyethylene wax (saponification number: 85) as used in Example 12 was introduced into a 1-liter flask and incorporated four times with 3 g (totalling 12g) of ethylene glycol while heating to 150° C under agitation. Each time the reaction was continued for one hour after the incorporation of the 3 g, a small amount of the reaction product was withdrawn from the flask, kept at 150° C and 2 mm Hg for at least one hour to remove the volatile matter therefrom and tested for infra-red absorption and penetration degree.

The equivalent necessary to esterify the carboxyl groups contained in the maleinated wax having a saponification number 85 to form the bridging of two molecules in the wax with every one molecule of ethylene glycol was about 12 g per 500 g of the maleinated wax and, in said reaction, it was divided into four portions which were then incorporated one by one, that is, the four-time incorporation was effected.

The result that the absorption of the cyclic acid anhydride (at 1,790 cm$^{-1}$ and 1,860 cm$^{-1}$) was decreased and the absorption of the ester (at 1,735 cm$^{-1}$) was increased, showed that the reaction was quantitatively completed.

The penetration degrees measured were as shown in Table 12.

Table 12

|  | Ethylene glycol/carboxyl group ratio in equivalent for bridging | | | | |
| --- | --- | --- | --- | --- | --- |
|  | 0 | 1/4 | 2/4 | 3/4 | 4/4 |
| Penetration degree | 9.0 | 5.0 | 3.0 | 2.0 | 2.0 |

The waxes used for polishing agents are generally required to have a penetration number of 4.0 or lower, and this is achieved by esterifying at least a half of the carboxyl groups contained in a starting maleinated wax with ethylene glycol to effect the bridging, thus obtaining sufficient hardness on the esterified wax.

EXAMPLE 14

The esterified wax (product wax (II)) obtained in Example 12 was compounded with the other ingredients shown by the following formulation and was easily emulsified. A portion of the emulsion was allowed to stand still at 40° C for 24 hours and another portion thereof was subjected to the three-time "freeze-melt" repetition test with the result that these two portions did not cause gelling, wax separation and the like therein. The emulsion was also found not to cause wax separation even when subjected to centrifugation at 3,000 rpm for 5 minutes.

| Product wax (II) of Example 12 | 11 | wt.% |
| --- | --- | --- |
| Oleic acid | 1.5 | |
| Morpholine | 1.5 | |
| Levelling agent | 11 | |
| Water | 75 | |

The emulsion was coated on wood pieces, polyvinyl chloride-made tiles, glass and the outer surfaces of car bodies to form thereon coatings which were then observed and tested for their properties to make the "five grades estimation". The results are shown in Table 14.

EXAMPLE 15

The procedure of Example 14 was followed except that the product wax (II) was used in the amount of 6 wt.% in substitution for 12 wt.% and 140° F paraffin was additionally used in the amount of 5 wt.%, to prepare an emulsion. The emulsion so prepared was found to be the same in stability as that described in Example 14. The emulsion was coated on the same substrates as used in Example 14 to form thereon coatings which were then subjected to tests for their properties in order to make the "five grades estimation". The results are shown in Table 14.

COMPARATIVE EXAMPLE 7

Carnauba wax No. 2 and an oxidized wax were emulsified under the following formulation to form an emulsion. The emulsion so formed was tested for the same items as in Example 14 and estimated. The results are shown in Table 14. The oxidized wax used herein was the same as used in Example 14.

| Carnauba wax No. 2 | 3 | wt.% |
| --- | --- | --- |
| Oxidized wax | 3 | |
| 140° F paraffin | 5 | |
| Oleic acid | 1.5 | |
| Morpholine | 1.5 | |
| Levelling agent | 11 | |
| Water | 75 | |

COMPARATIVE EXAMPLE 8

The procedure of Comparative example 7 was followed except that the carnauba wax No. 2 was replaced by the oxidized wax in the same amount, that is, 6 wt.% of the oxidized wax was used as the only wax, to form an emulsion. The emulsion so formed was tested for the same items as in Example 14 and estimated. The results are shown in Table 14.

Table 14

Estimation of Performances of Emulsions
(Five Grades Estimation)

|  | Example 14 | Example 15 | Comparative example 7 | Comparative example 8 |
|---|---|---|---|---|
| Heat stability | 5 | 5 | 5 | 5 |
| Freeze-Melt stability | 5 | 5 | 5 | 4 |
| Polish film (Color, cloudiness, cracks of coating on glass) | 4 | 5 | 5 | 4 |
| Luster | 5 | 5 | 5 | 3 |
| Levelling performance | 5 | 5 | 5 | 5 |
| Water spot | 5 | 5 | 4 | 5 |
| Removability | 5 | 5 | 5 | 4 |
| Wear when wetted | 4 | 3 | 2 | 4 |
| Pulverizability | 5 | 5 | 5 | 5 |
| Black heel mark | 5 | 5 | 5 | 5 |
| Scuff mark | 4 | 4 | 5 | 5 |
| Anti-slip performance | 5 | 5 | 4 | 5 |

As is seen from the above, the product wax (II) obtained in Example 12 was comparable or superior to carnauba wax as the principal ingredient for polishing emulsions, was excellent in stability, luster and the like as compared with the conventional synthetic oxidized waxes when in the emulsion form thereof. In addition, the novel wax was found to exhibit excellent workability when treated.

EXAMPLE 16

Fifty grams of a maleic anhydride-modified polyethylene wax (average mol. wt., 675; saponification number, 85; penetration degree, 8.5) were introduced into a 200-c.c., three-necked flask, heated to 150° C to be melted after purging the reaction system with $N_2$, incorporated with 2.8 g of $Ca(OH)_2$ in powder form and incorporated slowly with 6 c.c. of water while agitating the resulting mixture in the flask. The water was partly refluxed naturally at the upper inner wall of the flask, and the remainder thereof was evaporated to escape out of the reaction system. The dropwise incorporation or addition of said water took 1.5 hours, the subsequent agitation took 0.5 hours and the reduce-pressure distillation at 10-20 mm Hg took 0.5 hours to remove the remaining water from the reaction system.

The starting product wax (I) and the product wax (III) obtained had the properties as shown in Table 15.

Table 15

|  | Average mol.wt. | Penetration degree | Melting point | Saponification number | Ca content |
|---|---|---|---|---|---|
| Starting product wax (II) | 675 | 8.5 | 87° C | 85 | 0 |
| Product wax (III) obtained | 1,410 | 1.0 | 87° C | 85 | 2.7 wt.% |

The infra-red absorption for the cyclic acid anhydride (double lines at 1860 $cm^{-1}$ and 1790 $cm^{-1}$) almost disappeared and that for the acid salt (triple lines at 1595 $cm^{-1}$, 1560 $cm^{-1}$ and 1530 $cm^{-1}$) appeared instead. This clearly shows that the Ca reacted with the carboxyl groups to effect bridging between two molecules in the wax, thereby remarkably increasing the resulting wax in hardness.

COMPARATIVE EXAMPLE 9

The procedure of Example 16 was followed except that the water was not added. The starting and resulting waxes exhibited no differences in infra-red absorption, this clearly showing that the addition of water was necessary for the reaction in Example 16.

EXAMPLE 17

Five hundred grams of a maleic anhydride-modified polyethylene wax (saponification number, 83; penetration degree, 11) were placed in a 1-liter four-necked flask and, after purging the space in the reaction system with $N_2$, heated to 150° C to be melted. In order to see how the resulting wax varies in hardness as the carboxyl groups in the starting maleinised wax are gradually converted to the calcium salt thereof, $Ca(OH)_2$ was added to the flask intermittently in four portions; more particularly, (1) 2.74 g, (2) 2,60 g, (3) 4.93 g and (4) 13.95 g of $Ca(OH)_2$ were added in that order. Each time on portion of $Ca(OH)_2$ was added, 25 c.c. of water were slowly added to the flask, the mixture was agitated for 1 - 2 hours and part (about 30 c.c.) of the wax neutralized was withdrawn as a sample from the flask, followed by adding the next portion. The sample was dried in vacuo and then measured for penetration degree. The $Ca(OH)_2$ equivalent necessary to give calcium ions ($Ca^{++}$) to the carboxyl groups in 500 g of the starting wax (saponification number: 83) in the ratio of one ion: one carboxyl group was 27.4 g; the cumulative amounts of $Ca(OH)_2$ added at the four-time additions were respectively (1) 1/10, (2) 2/10, (3) 4/10 and (4) 10/10. The amounts of $Ca(OH)_2$ to be actually added at the second to fourth additions were respectively corrected in view of the amount of the used $Ca(OH)_2$ withdrawn together with the sample from the flask each time sampling was effected. The results are shown in Table 16.

Table 16

| Ratio in equivalent of $Ca^{++}$ to carboxyl groups in starting wax | 0 | 0.1 | 0.2 | 0.4 | 1.0 |
|---|---|---|---|---|---|
| Penetration degree of product wax | 11.0 | 6.5 | 3.5 | 2.5 | 0.5 |

From this Table it is found that a sufficient hardness may be obtained on the wax by effecting bridging therein by means of neutralizing at least one fifth (1/5) of the carboxyl groups in the wax with the calcium compound to form a Ca salt thereof, since waxes used for polishing agents are generally required to have a hardness corresponding to a penetration number of 4.0 or lower.

EXAMPLE 18

Three liters of a maleic anhydride-modified polyethylene wax (saponification number of 79, penetration degree of 9.5) in a molten state were introduced into a 5-liter four-necked flask and, after purging the space in the reaction system with $N_2$, incorporated dropwise with 122.5 c.c. of an aqueous 30 wt.% solution of $CaCl_2$ over a time period of 1.5 hours. The amount so incorporated was one which was sufficient to neutralize therewith one fourth (1/4) of the carboxyl groups in the wax to form a calcium salt thereof. The reaction mixture obtained was then subjected to stripping using $N_2$ to remove therefrom the remaining water and the evolved HCl.

The product wax obtained had a metallic luster and a penetration degree of 1.0.

EXAMPLE 19

The procedure of Example 16 was repeated except that the powdered $Ca(OH)_2$ was substituted by 3.8 g of $CaCO_3$ and the water by 6 c.c. of a 1.5-N HCl being dropwise added slowly. The reaction proceeded while accompanied with foaming. The gases evolved were collected in an aqueous solution of NaOH, to which was added an aqueous solution of each of $AgNO_3$ and $CaCl_2$ to precipitate AgCl and $CaCO_3$ whereby it was confirmed that HCl and $CO_2$ gases were evolved in large amounts.

The product wax obtained had a metallic luster and a penetration degree of 1.0.

EXAMPLE 20

The neutralized or metal-containing wax obtained in Example 18 was measured for basic physical properties to compare it with commercially available waxes. The physical properties of the latter were partly based on the catalogues thereof.

The oxided wax indicated in the following Table 17 was one produced by a certain company (B) and the polyethylene wax indicated therein a non-emulsion type one produced by another certain company (S), these two waxes being among those having the greatest sale.

Table 17

| | Product wax of Example 18 | Carnauba latex No. 1 | Oxidized wax | Polyethylene wax |
|---|---|---|---|---|
| Color | Yellow-brown | Yellow | White | White |
| Odor | Odorless | Fragrant | Offensive odor | Odorless |
| Mol.wt. | 850 | 755 | — | |
| Melting point | 89° C | 86° C | 100° C | 105° C |
| Melt viscosity | | | | |
| 120° C | 35 cp | 14 cp | 75 cp | 400 cp |
| 150° C | 15 cp | 7 cp | 40 cp | 180 cp |

EXAMPLE 21

The product wax obtained in Example 18 was compounded with the other ingredients as indicated in the following formulation and then easily emulsified. A portion of the emulsion so obtained was allowed stand still at −10° C for 8 hours and another portion thereof subjected three times repeatedly to the "Freeze-Melt" test with the result that these portions did not exhibit gelling nor wax separation. Furthermore, the emulsion did not exhibit wax separation even after subjected to centrifugation at 3,000 rpm for 5 minutes.

| Product wax of Example 18 | 11 wt.% |
|---|---|
| Oleic acid | 1.5 |
| Morpholine | 1.5 |
| Levelling agent | 11 |
| Water | 75 |

The emulsion was coated on wood pieces, polyvinyl chloride-made tiles, glass and the outer surfaces of car bodies to form thereon coatings which were observed and tested for their specific properties, thus subjecting the coatings to the "five grades estimation". The results are shown in Table 18.

EXAMPLE 22

The procedure of Example 21 was followed except that 11 wt.% of the wax was substituted by 6 wt.% of the same wax and 5 wt.% of 140° F paraffin additionally used, to form an emulsion. The emulsion so obtained was found to be the same in stability as that in Example 21.

In quite the same manner as in Example 21, the emulsion was coated on substrates to form thereon coatings which were then observed and tested for their specific porperties, thus subjecting the coatings to the "five grades estimation". The results are shown in Table 18.

COMPARATIVE EXAMPLE 10

Carnauba wax No. 2 and the oxidized wax obtained in Example 20 were emulsified together with the other ingredients as shown in the following formulation. The emulsion thus obtained was tested for quite the same items as in Example 21 and it was then estimated. The results are shown in Table 18.

| Carnauba wax No. 2 | 3 wt.% |
|---|---|
| Oxidized wax | 3 |
| 140° F paraffin | 5 |
| Oleic acid | 1.5 |
| Morpholine | 1.5 |
| Levelling agent | 11 |
| Water | 75 |

COMPARATIVE EXAMPLE 11

The procedure of Comparative example 10 was followed except that the carnauba No. 2 was replaced by the same amount of the oxidized wax (the oxidized was amounting to 6 wt.% and being used as the only wax in this case) to form an emulsion. The emulsion thus obtained was tested and estimated in the same manner as in Example 21 with the results being shown in Table 18.

From this Table it is found that the metal-containing wax obtained in Example 18 was very close or comparable to the naturally occurring carnauba wax as the principal ingredient for polishing emulsions, and that the metal-containing wax when in the emulsion form was excellent in stability, luster and the like and was also excellently workable when treated as compared with the conventional synthetic oxidised wax.

Table 18

Estimation of Performances of Polishing Emulsions (Five Grades Estimation) 5 (best) – 1 (worst)

|  | Example 21 | Example 22 | Comparative example 10 | Comparative example 11 |
|---|---|---|---|---|
| Heat stability | 5 | 5 | 5 | 5 |
| Freeze-Melt stability | 5 | 5 | 5 | 4 |
| Polish film (color, cloudiness and cracks) | 5 | 5 | 5 | 4 |
| Luster | 5 | 5 | 5 | 3 |
| Levelling performance | 4 | 5 | 5 | 5 |
| Water spot | 5 | 4 | 4 | 5 |
| Removability | 5 | 5 | 5 | 4 |
| Wear when wetted | 5 | 4 | 2 | 4 |
| Pulverizability | 5 | 5 | 5 | 5 |
| Black heal mark | 5 | 5 | 5 | 5 |
| Scuff mark | 4 | 4 | 5 | 5 |
| Anti-slip performance | 5 | 5 | 4 | 5 |

EXAMPLE 23

Using the product wax obtained in Example 2 and in accordance with the following formulation, an emulsion was prepared.

| Product wax of Example 2 | 10 | wt.% |
|---|---|---|
| Ca(OH)$_2$ | 1.5 | |
| Oleic acid | 1.5 | |
| Morpholine | 1.5 | |
| Levelling agent | 10.5 | |
| Water | 75 | |

The powdered Ca(OH)$_2$ was suspended under agitation in the wax melted at 120° C and incorporated slowly and simultaneously with a mixed solution of the oleic acid and morpholine as well as the water as a boiling water. After the whole of said mixed solution and about a half of the water had been incorporated or added, the resulting mixture was agitated for one hour and thereafter incorporated with the balance of the water while slowly cooling the reaction mixture without heating. After cooled to room temperature, the reaction mixture was incorporated with the levelling agent as an emulsion thereof which was separately prepared. The emulsion thus obtained exhibited none of changes such as gel formation and wax separation even after allowed to stand still at 24° C for 24 hours or subjected three times repeatedly to the "freeze-melt" test. In addition, the emulsion did not exhibit wax separation even after subjected to centrifugation at 3,000 rpm for 5 minutes.

In quite the same manner as in Example 22, the emulsion was treated to form coatings which were tested and estimated. The results are shown in Table 19.

COMPARATIVE EXAMPLE 12

The procedure of Example 23 was followed except that Ca(OH)$_2$ was not used at all with the result that the product obtained was a pasty and viscous material without fluidity. The reason for this is considered to be that since the product obtained was too highly hydrophilic, a large amount of water was embraced between the wax particles and the wax was still kept in a water-in-oil phase despite of its only 10 wt.% concentration in the emulsion; however, this is not theoretically known as yet.

Since this pasty, viscous material might nevertheless be coated for polishing, it was subjected to the same test as in Example 11. The results are shown in Table 19.

EXAMPLE 24

The procedure of Example 23 was followed except that the 1.5 wt.% of Ca(OH)$_2$ was substituted by 1.5 wt.% of ZnO, to form an emulsion. From its appearance, the emulsion so formed seemed to be approximately equal in quality to that obtained in Example 23. The emulsion was tested for a part of the same items as in Example 23 with the results being indicated in Table 19.

EXAMPLE 25

The procedure of Example 23 was repeated except that the 1.5 wt.% of Ca(OH)$_2$ was substituted by 2.5 wt.% of Mg(OH)$_2$, to form an emulsion. From its outer appearance, the emulsion so obtained seemed to be equally satisfactory to that obtained in Example 23. The emulsion was then tested for a part of the same items as in Example 23 with the results being shown in Table 19.

EXAMPLE 26

The procedure of Example 23 was followed except that a new formulation was used as shown below, to form an emulsion containing paraffin.

| Product wax of Example 2 | 6 | wt.% |
|---|---|---|
| Paraffin | 5 | |
| Ca(OH)$_2$ | 1.0 | |
| Oleic acid | 1.5 | |
| Morpholine | 1.5 | |
| Levelling agent | 12 | |
| Water | 73 | |

The emulsion so obtained was subjected to the same test as that obtained in Example 23 and was found to be identical in stability with that obtained in Example 23. The test results are indicated in Table 19.

COMPARATIVE EXAMPLE 13

Using carnauba wax No. 2 and the oxidized wax obtained in Example 6 as the wax ingredients and in accordance with the following formulation, an emulsion was obtained. The emulsion so obtained was tested and estimated for the same items as in Example 23. The results are shown in Table 19.

| Carnauba wax No. 2 | 3 | wt.% |
|---|---|---|
| Oxidized wax | 3 | |
| 140° F paraffin | 5 | |
| Oleic acid | 1.5 | |
| Morpholine | 1.5 | |
| Levelling agent | 11 | |

-continued

| Water | 75 |
|---|---|

COMPARATIVE EXAMPLE 14

The procedure of Comparative example 12 was followed except that the carnauba wax No. 2 was excluded and substituted therefor oxidized wax of Example 2 (the oxidized wax totalling 6 wt.%), to form an emulsion which was then tested and estimated for the same items as in Example 23 with the result being shown in Table 19.

As is seen from Table 19, the polishing emulsions which contained the product wax obtained in Example 23 as the main ingredient and were prepared according respectively to the formulations of Examples 23, 24, 25 and 26, were found to be comparable or superior in many of properties to polishing emulsions which contained carnauba and a conventional synthetic oxidized wax.

Table 19
Estimation of Performances of Polishing Emulsions (Five Grades Estimation) 5 (best) – 1(worst)

|  | Examples | | | | Comparative examples | | |
|---|---|---|---|---|---|---|---|
|  | 23 | 24 | 25 | 26 | 12 | 13 | 14 |
| Heat stability | 5 | 5 | 5 | 5 | 5 | 5 | 5 |
| Freeze-Melt stability | 5 | 5 | 5 | 5 | 5 | 5 | 4 |
| Polish film (color, cloudiness and cracks of coating on glass) | 5 | 5 | 5 | 5 | 5 | 5 | 4 |
| Luster | 5 | 5 | 5 | 5 | 5 | 5 | 3 |
| Water spot | 5 | 5 | 5 | 4 | 3 | 4 | 5 |
| Removability | 5 | 5 | 5 | 5 | 5 | 5 | 4 |
| Wear when wetted | 5 | 5 | 5 | 4 | 2 | 2 | 4 |
| Black heel mark | 5 | 5 | 5 | 5 | 4 | 5 | 5 |
| Non-stickiness | 5 | 5 | 5 | 5 | 2 | 4 | 4 |

More particularly, the product wax obtained in Example 23 is superior not only in workability during its treatment but also in luster and stability when in its emulsion form, to the conventional synthetic oxidized waxes. In addition, the emulsions which contained a metal such as Mg, Ca or Zn and were prepared in Examples 23–26, were found to be very remarkably improved in non-stickiness and properties against water as compared with the emulsion which contained oxidized wax of Example 23 and was prepared in Comparative example 13 and with the emulsion which contained carnauba wax and was prepared in Comparative example 14.

What is claimed is:

1. In a process for preparing a metal-containing polyolefin wax comprising melting a reaction product of a starting polyolefin wax having an average molecular weight of 400 – 1,500 and an ethylenically unsaturated dibasic acid having 4 – 5 carbon atoms or anhydride thereof and reacting the melted reaction product with a metal compound in which the metal is selected from the metals of Group II of the Periodic Table, to produce an acid-modified polyolefin wax, the improvement which comprises reacting said acid-modified polyolefin wax and Group II metal compound at 100°–200° C in the presence of water or a volatile acid as a catalyst thereby to obtain the metal-containing polyolefin wax.

2. A process according to claim 1, wherein the volatile acid is a member selected from the group consisting of hydrochloric acid, nitric acid and formic acid.

3. A process according to claim 1, wherein the starting polyolefin wax is a member selected from the group consisting of polyethylenes, polypropylenes, ethylene-propylene copolymers and mixtures thereof, each having an average molecular weight of 400 – 1,500.

4. A process according to claim 1, wherein the ethylenically unsaturated dibasic acid or anhydride thereof is a member selected from the group consisting of maleic, fumaric, citraconic, itaconic and glutaconic acids, and maleic and citraconic anhydrides; and the metal compound is a member selected from the group consisting of calcium oxide, calcium hydroxide, calcium carbonate, calcium chloride, magnesium oxide, magnesium hydroxide, zinc oxide and zinc hydroxide.

5. A process according to claim 4, wherein the starting polyolefin wax is a member selected from the group consisting of polyethylenes, polypropylenes, ethylene-propylene copolymers and mixtures thereof, each having an average molecular weight of 400 – 1,500.

6. A metal containing polyolefin wax prepared by the process of claim 1.

7. A metal-containing polyolefin wax prepared by the process of claim 2.

8. A metal-containing polyolefin wax prepared by the process of claim 3.

9. A metal-containing polyolefin wax prepared by the process of claim 4.

10. A metal-containing polyolefin wax prepared by the process of claim 5.

11. An aqueous polishing emulsion containing a wax according to claim 6.

12. An aqueous polishing emulsion containing 2 – 15% by weight of a wax according to claim 6.

13. An aqueous polishing emulsion characterized by containing a metal-containing polyolefin wax of claim 10 in amounts of 2 – 15% by weight based on the polishing emulsion.

* * * * *